March 22, 1927.
P. A. DAWSON
GOGGLES
Filed April 15, 1926
1,621,629
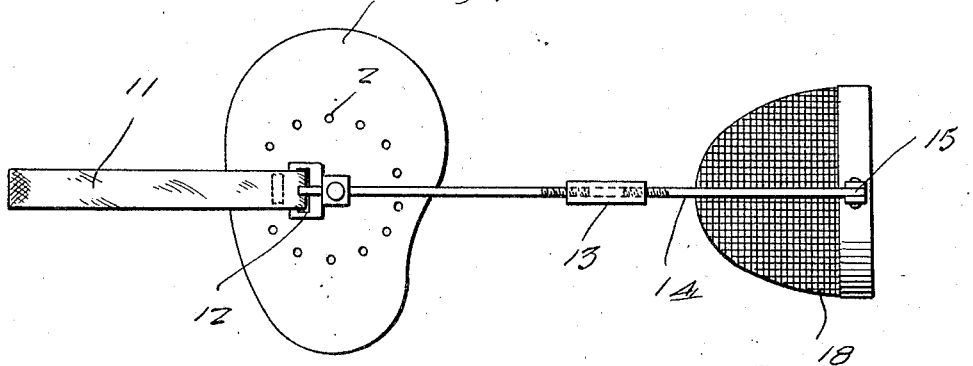
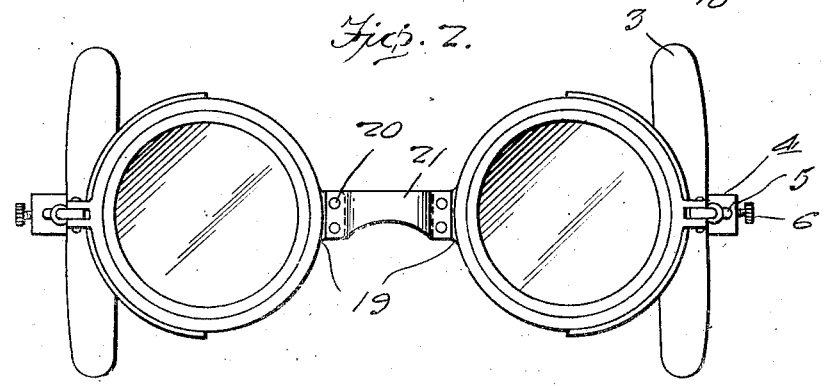
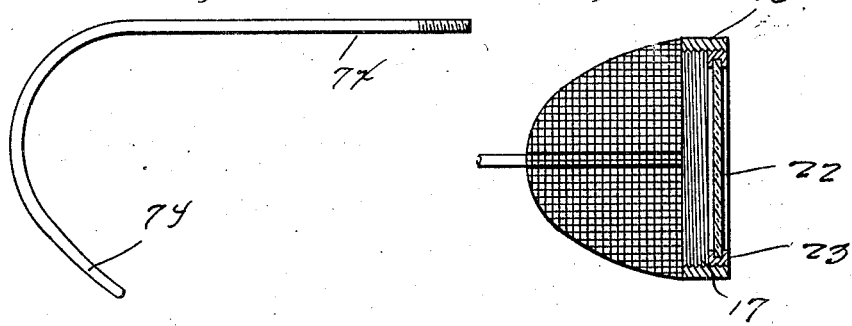
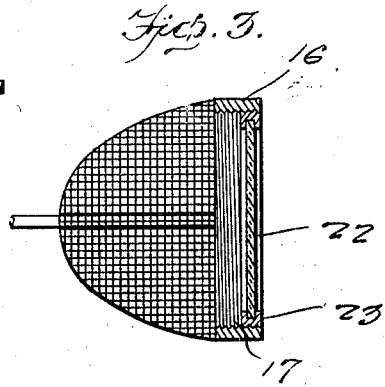
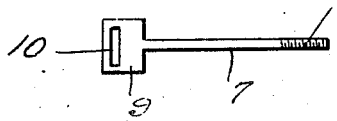
Inventor
P. A. Dawson
By Clarence A O'Brien
Attorney Patented Mar. 22, 1927.

1,621,629

UNITED STATES PATENT OFFICE.

PAUL A. DAWSON, OF AKRON, OHIO.

GOGGLES.

Application filed April 15, 1926. Serial No. 102,223.

My invention pertains to goggles and more particularly to goggles such as are used by workmen engaged in chipping operations.

Experience has demonstrated that goggles extant are objectionable and hard on the eyes of workmen inasmuch as the lenses are too close to the eyes of the wearer and the eye lashes rub against the lenses, and therefore, one of the objects of my said invention is the provision of goggles in which the lenses may be adjusted forwardly and rearwardly when the nose piece is fitted on the nose and the temple bars are accurately fitted to the distance between the nose and ears of the wearer, this in order that the objectionable rubbing of the eye lashes against the rear sides of the lenses may be averted.

Another object of the invention is the provision of goggles equipped with ear engaging devices adapted to serve the twofold function of sound mufflers and connectors for the temple bars of the goggles to the ears.

Other objects and practical advantages of the invention will be fully understood from the following description and claims when the same are read in connection with the drawings, accompanying and forming part of this specification, in which:—

Figure 1 is a side elevation of one preferred embodiment of my invention.

Figure 2 is a front elevation of the same.

Figure 3 is a longitudinal vertical fragmentary section taken through one of the lens frame of the goggles, looking outwardly.

Figure 4 is a detail elevation of one of the sections of one temple bar of the goggles.

Figure 5 is a side elevation of a modified temple bar section hereinafter explicitly referred to.

Similar numerals designate corresponding parts in Figures 1 to 4 to which reference will first be made.

The embodiment of my invention illustrated in Figures 1 and 2 comprises among other elements mufflers 1, designed to exclude noises from the ears of the wearer while contributing to the holding of the temple bars of the goggles in proper working position on the head of the wearer. The said mufflers 1 are provided with minute apertures 2 and are shaped in conformity to the human ear and are flanged as designated by 3 so as to straddle the edges of the ears and thereby maintain themselves in working position on the ears. At their outer sides the said mufflers 1 are provided with lateral projections 4 which are provided with longitudinal bores 5 and are equipped with set screws 6 disposed at right angles to the bores 5 and designed to adjustably fix to the projections 4 temple bar sections such as 7, Figures 1 and 4. The temple bar sections 7 are threaded at their forward ends as designated by 8 and are provided at their rear ends with heads 9 in which are slots 10 for the connection of a head strap 11, the head strap 11 being preferably elastic, and one of the heads on one temple bar section 7 being preferably provided with a buckle tongue 12 as illustrated for the adjustable connection of the strap 11 to the said temple bar section.

The temple bar sections referred to are connected through the medium of turn buckles 13 with forward temple bar sections 14, and the said forward temple bar sections 14 are hingedly connected at 15 to annular frames 16 of considerable width, the said annular frames 16 being interiorly threaded as designated by 17. It will also be noticed that the frames 16 are provided with lateral guard sections 18 of reticulated material, which guards 18 describe the arc of a circle in cross-section and are preferably shaped in outlined as appears in Figures 1 and 3.

The guards 18 are, of course, carried by the outer portions of the annular frames 16, and it will be noted by reference to Figure 2 that each annular frame 16 is provided at its inner side with a lateral wing 19. The said wings 19 are provided with threaded apertures for the reception of screws 20 through the medium of which a nose piece 21 is connected with the annular frames 16, and at this point I would have it understood that the wings 19 reach inwardly from the rear portions of the frames 16 so that the nose piece 21 will rest in a transverse vertical plane in rear of the vertical plane of the lenses 22 in the frames 16. I would also have it understood at this point that the lenses 22 are disposed and held in annuli or rims 23, which annuli or rims are peripherally threaded and are therefore held in the frames 16 and this in such manner that the lenses may be readily and nicely adjusted in the direction of the length of the goggles so as to properly position the lenses 22 relative to the eyes of the wearer and avert the objectionable rubbing of the eye lashes of the wearer against the rear sides of the lenses.

When it is not desired to use temple sections 7 or mufflers such as 1 or a head strap such as 11, I employ in lieu of the temple bar sections 7, temple bar sections 7$^x$ such as shown in Figure 5; the said temple bar sections 7$^x$ having hooks 7$^y$ at their rear ends to engage the ears of the wearer of the goggles in conventional manner.

In both embodiments of my invention the temple bars are susceptible of being readily adjusted as to length, and this manifestly contributes to the facility with which the nose piece and the lenses may be accurately positioned.

It will be apparent from the foregoing that notwithstanding the capacity of function ascribed to my improvement, the improvement is simple and inexpensive in construction and in all respects is well adapted to withstand the usage to which goggles are ordinarily subjected.

While I prefer the construction herein disclosed, I do not desire to be understood as limiting myself to the precise construction and relative arrangement of parts, my invention being defined by my appended claims within the scope of which modifications may be made without departure from my invention.

Having described my invention, what I claim and desire to secure by Letters Patent, is:—

1. In combination, lens frames, lenses therein, a nose piece interposed between and joining the lens frames, mufflers shaped to fit over the ears and provided with minute openings and also provided with outwardly extending projections having longitudinal bores and equipped with set screws, temple bars connected with the lens frames and extending through the said longitudinal bores of said projections and adapted to be engaged by said set screws.

2. In combination, lens frames, lenses therein, a nose piece interposed between and joining the lens frames, mufflers shaped to fit over the ears and provided with minute openings and also provided with outwardly extending projections having longitudinal bores and equipped with set screws, temple bars connected with the lens frames and extending through the said longitudinal bores of said projections and adapted to be engaged by said set screws; and a head strap connected with the temple bar portion disposed in rear of the projections on the mufflers.

In testimony whereof I affix my signature.

PAUL A. DAWSON.